UNITED STATES PATENT OFFICE.

ARTHUR G. PEUCHEN, OF TORONTO, ONTARIO, CANADA.

PAINT COMPOUND.

SPECIFICATION forming part of Letters Patent No. 281,131, dated July 10, 1883.

Application filed November 2, 1882. (Specimens.)

*To all whom it may concern:*

Be it known that I, ARTHUR G. PEUCHEN, of Toronto, in the Province of Ontario and Dominion of Canada, have invented a new and useful Improvement in Paint Compounds or Mixtures, of which the following is a full, clear, and exact description.

My invention has for its object the production of a liquid mixed paint which shall be cheap to manufacture, will dry fast and with a hard finish, be easy to work and not liable to crack or peel, will cover a larger surface than lead and oil alone would do, will retain its color, or not turn yellow, as ordinary paint does, when used on the inside of buildings, and will penetrate most surfaces, including wood and iron, and prevent decay. These results my improved liquid mixed paint effectually secures.

The composition consists, first, in a certain liquid compound or vehicle for the body of the paint; and, secondly, in a certain body compound for mixture with said liquid compound, the two compounds being combined so as to form a liquid mixed paint.

The liquid compound has for its ingredients boiled linseed-oil mixed with silicate of soda, naphtha mixed with alum, a potash solution formed by dissolving chloride of calcium in water, raw linseed-oil and resin, and cod-oil mixed with brown japan.

To prepare this liquid compound in quantities suitable for making twelve pounds or one and one-eighth gallon of liquid paint, I take one-quarter (¼) of a gallon of naphtha and dissolve it in one-quarter (¼) of an ounce of alum; also one-quarter (¼) of a gallon of boiled linseed-oil and dissolve in it one-quarter (¼) of an ounce of silicate of soda; likewise, make a potash solution consisting of one-eighth (⅛) of an ounce of chloride of calcium in one (1) quart of water. I then mix in equal proportions dry resin and raw linseed-oil sufficient to make one-eighth (⅛) of a gallon; and, furthermore, mix in equal proportions sufficient to make one-eighth (⅛) of a gallon cod-oil and brown japan. These several mixtures are then put one after another in any suitable mixer, and, after being well mixed, are run in a liquid state through a sieve or iron mill, when the compound will be ready for use. This makes one (1) gallon of the liquid compound, and to make the full complement of paint as above specified, when the same is required to be of a dark drab color, I add to said quantity of liquid a body compound, to give the necessary body to the paint, consisting of the following ingredients, in or about the proportions stated, namely: American oxide of zinc, one (1) pound; French oxide of zinc, one (1) pound; white lead, one (1) pound; China clay or earth, one (1) pound, and dissolved asphaltum, golden ocher, and Venetian red in the proportions of one-half (½) of an ounce each.

Having thus described my invention, what I claim as new, and desire to secure by Letters Patent, is—

The within-described liquid mixed paint, composed of a liquid compound consisting of boiled linseed-oil, silicate of soda, naphtha, alum, potash solution, raw linseed-oil, resin, cod-oil, and brown japan, and a body compound made up of American oxide of zinc, French oxide of zinc, white lead, China clay, dissolved asphaltum, golden ocher, and Venetian red, all in or about the proportions specified.

ARTHUR G. PEUCHEN.

Witnesses:
JAMES MACLIQSER,
GEORGE BELL.